(12) United States Patent
Someya

(10) Patent No.: US 6,662,672 B2
(45) Date of Patent: Dec. 16, 2003

(54) LINEAR ACTUATOR

(75) Inventor: Mitsuhiro Someya, Ibaraki-ken (JP)

(73) Assignee: SMC Kabushiki Kaisha, Tokyo (JP)

( * ) Notice: Subject to any disclaimer, the term of this patent is extended or adjusted under 35 U.S.C. 154(b) by 57 days.

(21) Appl. No.: 09/998,306

(22) Filed: Dec. 3, 2001

(65) Prior Publication Data

US 2002/0066326 A1 Jun. 6, 2002

(30) Foreign Application Priority Data

Dec. 4, 2000 (JP) .......................................... 2000-369192

(51) Int. Cl.⁷ ............................................... F16H 13/00
(52) U.S. Cl. ........................ 74/89.23; 74/89.4; 74/89.22
(58) Field of Search ............................... 74/89.23, 89.4, 74/89.39, 89.2, 89.21, 89.22

(56) References Cited

U.S. PATENT DOCUMENTS 6,084,326 A  *  7/2000 Nagai et al. .................. 310/80
6,148,714 A     11/2000 Abe et al. ...................... 92/88

* cited by examiner

*Primary Examiner*—William C Joyce
(74) *Attorney, Agent, or Firm*—Paul A. Guss

(57) ABSTRACT

A linear actuator comprises a rotary driving source, a tube member which is supported by a support rib extending in a substantially horizontal direction along a side section of a base member, an internal movable member and an external movable member which are integrally displaceable along the tube member under the magnetic coupling action, a slide screw shaft which is connected to a drive shaft of the rotary driving source and which transmits the rotary driving force to the internal movable member, and a slide screw nut for the slide screw shaft to be screwed therein for converting the rotary motion into the rectilinear motion.

11 Claims, 9 Drawing Sheets

LINEAR ACTUATOR

BACKGROUND OF THE INVENTION

1. Field of the Invention

The present invention relates to a linear actuator in which an internal movable member reciprocates along a hole of a tube member under the driving action of a rotary driving source. An external movable member including a slider provided outside of the tube member can be displaced integrally with the internal movable member.

2. Description of the Related Art

A magnet type rodless cylinder has been conventionally used as a mechanism for transporting or positioning a workpiece or the like. The magnet type rodless cylinder includes a piston which reciprocates along a hole of a cylinder tube under the action of a pressure fluid supplied into the cylinder tube, and a slider which surrounds the outer circumferential surface of the cylinder tube. The reciprocating motion of the piston is transmitted to the slider by the magnetic force of magnets which are incorporated into the piston and the slider respectively to integrally displace the piston and the slider.

The present applicant has suggested a rodless cylinder comprising a support rib for a cylinder tube which can keep the cylinder tube and a slider being out of contact with each other even if the displacement range of the slider is increased. The above rodless cylinder reduces generation of the dust and can be preferably used in an environment where the cleanness is required. The environment includes clean rooms for the medical purpose, the food manufacture, the semiconductor production steps or the like (see U.S. Pat. No. 6,148,714).

SUMMARY OF THE INVENTION

It is a general object of the present invention to provide a linear actuator which makes it possible to highly accurately stop, at an arbitrary intermediate position, an external movable member which is displaceable integrally with an internal movable member in an environment where the cleanness is required.

It is a principal object of the present invention to provide a linear actuator which makes it possible to smoothly displace the external movable member upon the start or the stop thereof.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
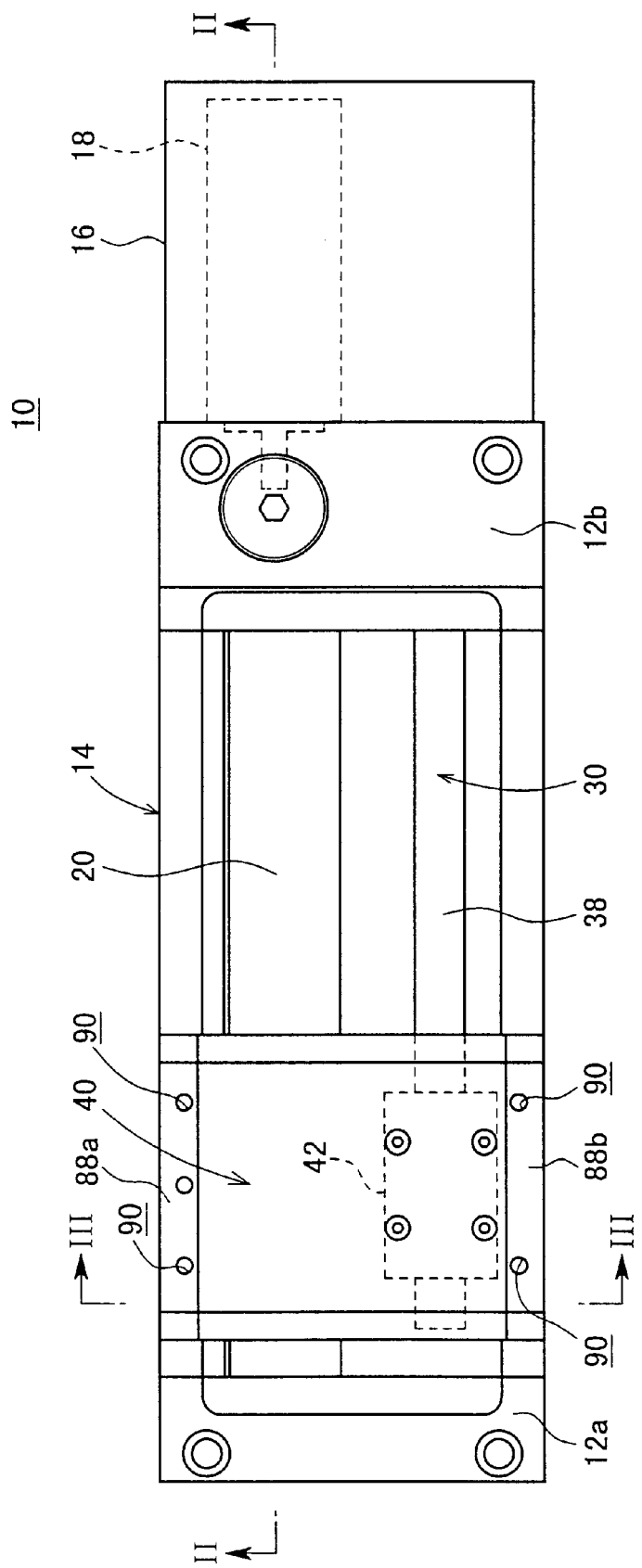
FIG. 1 is a plan view in a state in which a top cover of a rodless cylinder according to an embodiment of the present invention is detached.
Figure 2:
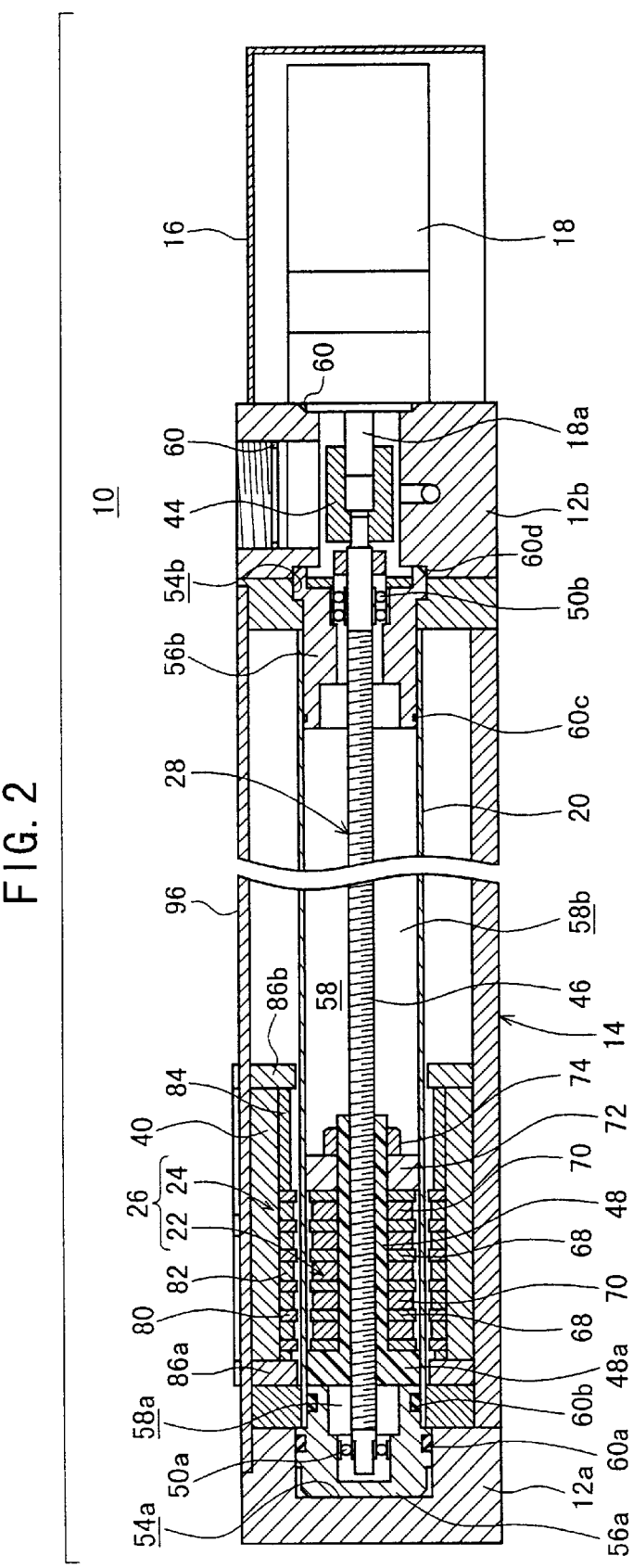
FIG. 2 is, with partial omission, a longitudinal sectional view taken along a line II—II shown in FIG. 1.

With reference to FIGS. 1 and 2, reference numeral 10 indicates a rodless cylinder according to an embodiment of the present invention.

The rodless cylinder 10 basically comprises a lengthy base member 14 which is connected with a pair of end blocks 12a, 12b at axial both ends, a rotary driving source 18 which is accommodated in a housing 16 and which is connected to the second end block 12b, and a displacement mechanism 26 which deviates toward the first side that is substantially perpendicular to the central axis of the base member 14. The displacement mechanism 26 has an internal movable member 22 and an external movable member 24 that are displaceable along a tube member 20 under the driving action of the rotary driving source 18. The base member 14 and the pair of end blocks 12a, 12b function as a base mechanism.

The rodless cylinder 10 further comprises a rotary driving force-transmitting mechanism 28 and a guide mechanism 30. The rotary driving force-transmitting mechanism 28 transmits the rotary driving force of the rotary driving source 18 to the internal movable member 22 and converts the rotary motion into the rectilinear motion of the internal movable member 22. The guide mechanism 30 deviates toward the second side that is substantially perpendicular to the central axis of the base member 14 and linearly guides the external movable member 24.

The housing 16 accommodating therein the rotary driving source 18 has a soundproof function. In addition, the housing 16 prevents dust or the like from being externally discharged.

Figure 3:
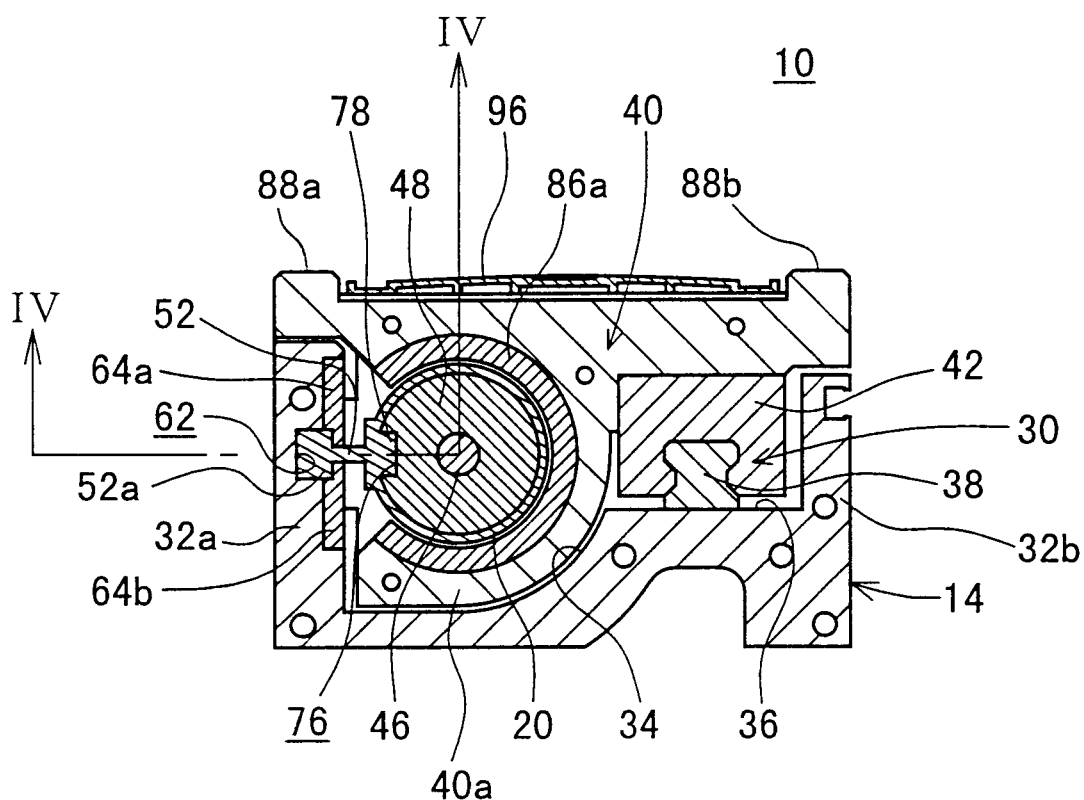
FIG. 3 is a vertical sectional view taken along a line III—III shown in FIG. 1, including the top cover.

As shown in FIG. 3, the base member 14 has a pair of side sections 32a, 32b which are substantially parallel to one another in the longitudinal direction. A curved section 34 and a flat section 36 are formed between the first side section 32a and the second side section 32b which are mutually opposed and spaced from each other by a given distance. The curved section 34 corresponds to the outer circumferential surface of the tube member 20. The flat section 36 has a linear guide rail 38 and a guide block 42. The linear guide rail 38 constitutes the guide mechanism 30 and extends in the axial direction of the base member 14. The guide block 42 is connected to a slider 40 as described later on and is slidable along the guide rail 38.

As shown in FIG. 2, the rotary driving force-transmitting mechanism 28 includes a slide screw shaft (feed screw shaft) 46 and a slide screw nut (feed screw nut) 48. The slide screw shaft 46 is substantially coaxially connected to a drive shaft 18a of the rotary driving source 18 via a coupling member 44 and penetrates through the tube member 20. The slide screw nut (feed screw nut) 48 has a screw hole for the slide screw shaft 46 to be screwed therein. An end of the slide screw shaft 46 is rotatably supported by a first bearing member 50a disposed on the first end block 12a. Another end thereof is rotatably supported by a second bearing member 50b disposed on the second end block 12b.

Both ends of the substantially cylindrical tube member 20 extending in the axial direction of the base member 14 are connected between the pair of end blocks 12a, 12b. The tube member 20 is supported by a support rib 52, the support rib 52 extending substantially horizontally and being formed integrally with the tube member 20 (see FIG. 3). An end of the tube member 20 is closed by a first closing member 56a secured into a recess 54a of the first end block 12a and another end thereof is closed by a second closing member 56b secured to a recess 54b of the second end block 12b (see FIG. 2).

The first and second closing members 56a, 56b also function as bearing-receiving members for holding the first and second bearing members 50a, 50b. A plurality of seal members 60a to 60d are installed by annular grooves to portions where the first and second closing members 56a, 56b are inserted into the tube member 20 to thereby keep a chamber 58 hermetical.

The internal movable member 22 is provided slidably along the hole of the tube member 20 in the chamber 58 of the tube member 20 closed by the first and second closing members 56a, 56b. The chamber 58 is divided by the internal movable member 22 into a first chamber 58a and a second chamber 58b.

As shown in FIG. 3, a long groove 62 extending longitudinally is formed on the inner wall surface of the first side section 32a of the base member 14. An engaging section 52a formed on the support rib 52 is inserted into the long groove 62. The engaging section 52a has a substantially rectangular cross section and is forcibly interposed between step portions of a pair of fixation plates 64a, 64b fastened by screws to the side section 32a of the base member 14. As a result, the support rib 52 is tightly fixed to the side section 32a of the base member 14 by the pair of fixation plates 64a, 64b.

As shown in FIG. 2, the internal movable member 22 includes the feed screw nut 48 and a plurality of ring members 68 and driving magnets 70. The feed screw nut 48 converts the rotary motion of the slide screw shaft 46 into the rectilinear motion under the screwing action of the slide screw shaft 46 into the feed screw nut 48. The plurality of ring members 68 and the driving magnets 70 are alternately and axially installed to the outer circumferential surface of the slide screw nut 48. Then, the slide screw nut 48 is preferably formed of a non-magnetic material such as synthetic resin. The ring member 68 is preferably formed of a magnetic material such as iron.

Each of the driving magnets 70 is magnetized such that a surface thereof resides in the north pole and another surface thereof resides in the south pole. Being adjacent to one another with the ring member 68 intervening therebetween, polarities of the driving magnets 70 are in mutually opposed directions. Therefore, the magnetic fields of the north pole and the south pole are alternately generated on the outer circumferential surfaces of the adjoining ring members 68.

The plurality of ring members 68 and the driving magnets 70 are interposed between a spacer 72 and a flange 48a expanding at one end of the slide screw nut 48 and are integrally joined by a lock nut 74 fitted to the other end of the slide screw nut 48.

Figure 4:
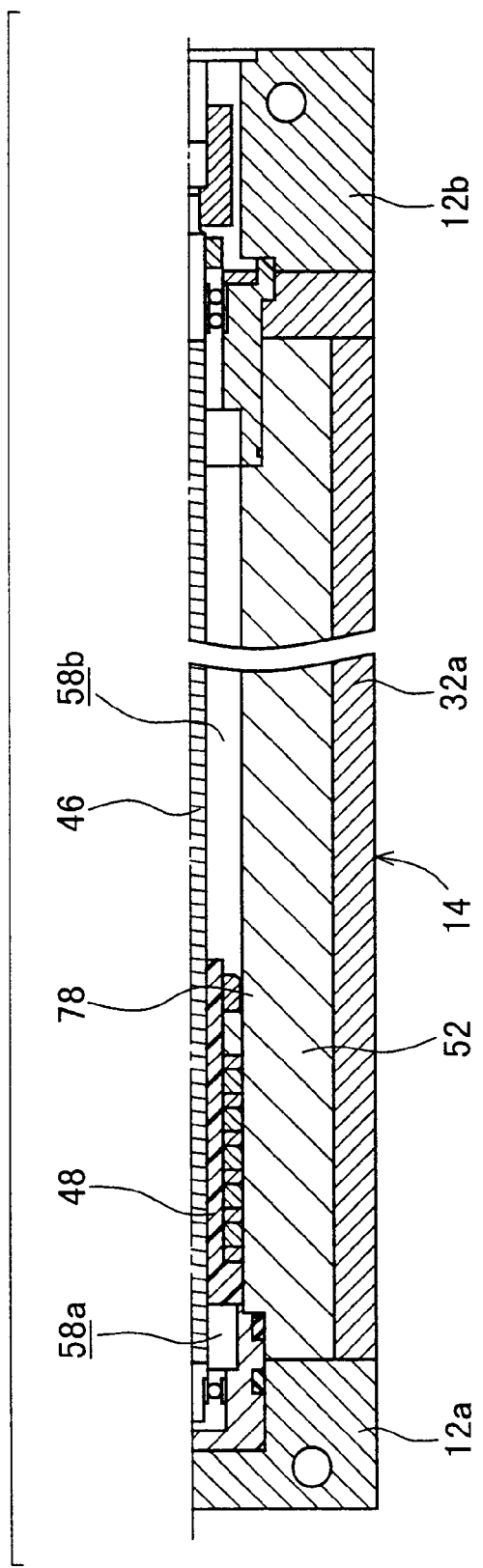
FIG. 4 is a lateral sectional view taken along a line IV—IV shown in FIG. 3.

As shown in FIG. 3, a long groove 76 is formed on the outer circumferential surface of the internal movable member 22 (slide screw nut 48, ring member 68, driving magnet 70, and spacer 72). The long groove 76 has a substantially rectangular cross section and extends substantially in parallel to the axis of the slide screw shaft 46. As shown in FIG. 4, a rotation-preventive plate 78 is formed integrally to expand on the inner wall surface of the tube member 20. The rotation-preventive plate 78 extends substantially horizontally in the same manner as the support rib 52 and is formed to be thin-walled with a narrow width. The internal movable member 22 is held against rotating if the rotation-preventive plate 78 engages with the long groove 76. The rotation-preventive plate 78 may be formed as a separate member with a material such as synthetic resin to thereby secure the rotation-preventive plate 78 to the inner wall surface of the tube member 20.

As shown in FIG. 3, the external movable member 24 includes the slider 40 whose lower side is connected with the guide block 42 that is slidably displaceable along the guide rail 38. The slider 40 is displaceable along the tube member 20 without contacting the outer circumferential surface of the tube member 20. A curved section 40a is formed at a lower portion of the slider 40 to cover the outer circumferential surface of the tube member 20. As shown in FIG. 2, the curved section 40a has driven magnets 82 and yokes 80 alternately disposed thereon. The yoke 80 is composed of magnetic members and has a substantially C-shaped cross section. The plurality of yokes 80 and the driven magnets 82 are supported by a spacer 84. A pair of end plates 86a, 86b for preventing the yokes 80, the driven magnets 82, and the spacer 84 from falling are secured to the ends of the slider 40.

A pair of attachment sections 88a, 88b protruding upwardly are formed at upper portions of the slider 40. A plurality of screw holes 90 for a workpiece to be attached therein are formed for the attachment sections 88a, 88b.

A top cover 96 (see FIG. 3) is detachably connected between the pair of end blocks 12a, 12b. The pair of attachment sections 88a, 88b of the slider 40 protrude upwardly from the sides of the top cover 96. The tube member 20, the guide mechanism 30 or the like are accommodated in an internal space which is formed by the top cover 96 and the side sections 32a, 32b of the base member 14. Accordingly, the dust or the like can be prevented from externally scattering.

Figure 5:
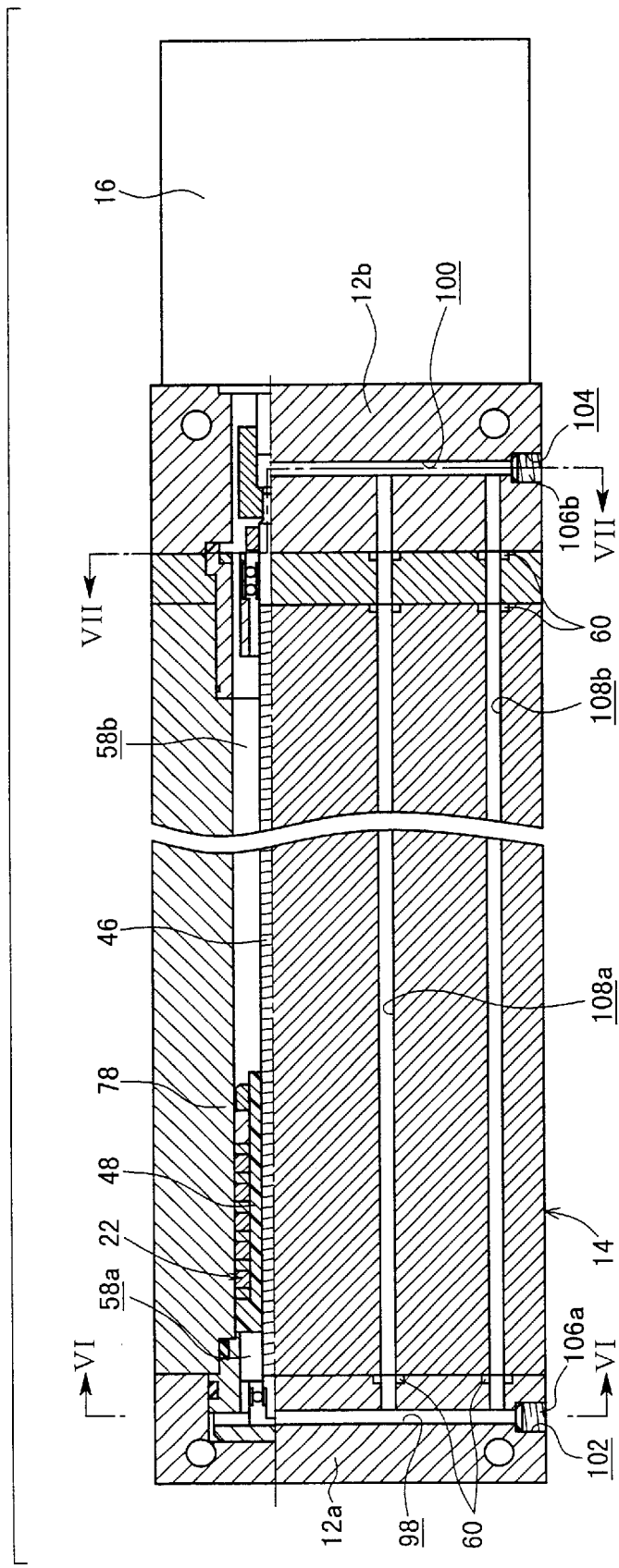
FIG. 5 is, with partial omission, a lateral sectional view illustrating the rodless cylinder shown in FIG. 1.
Figure 6:
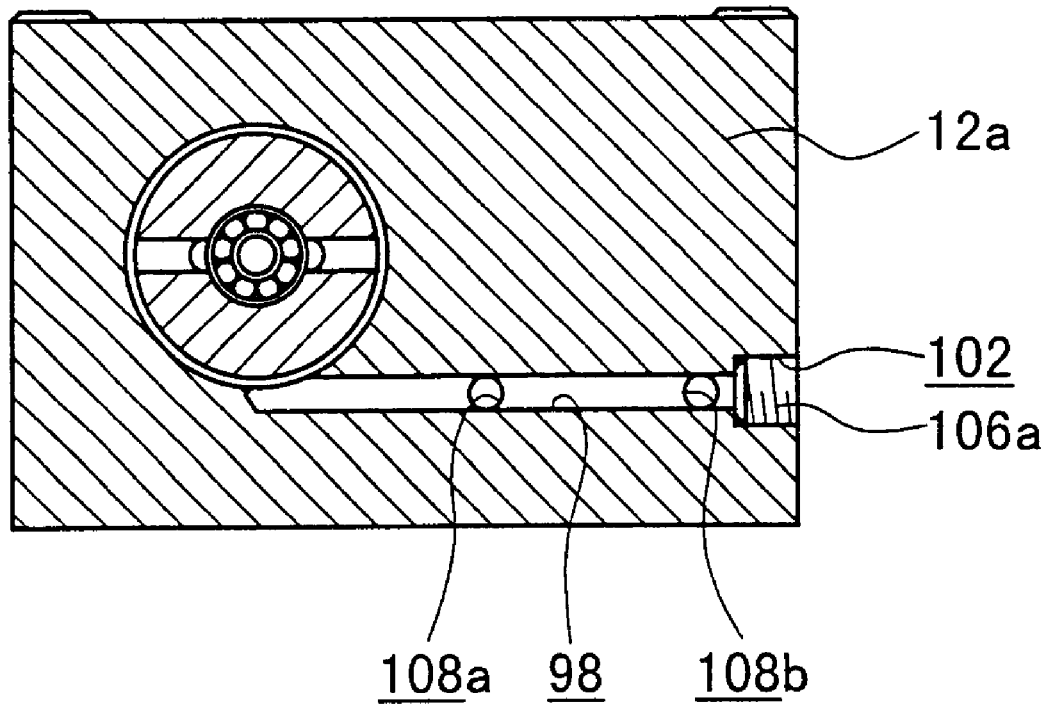
FIG. 6 is a vertical sectional view taken along a line VI—VI shown in FIG. 5.
Figure 7:
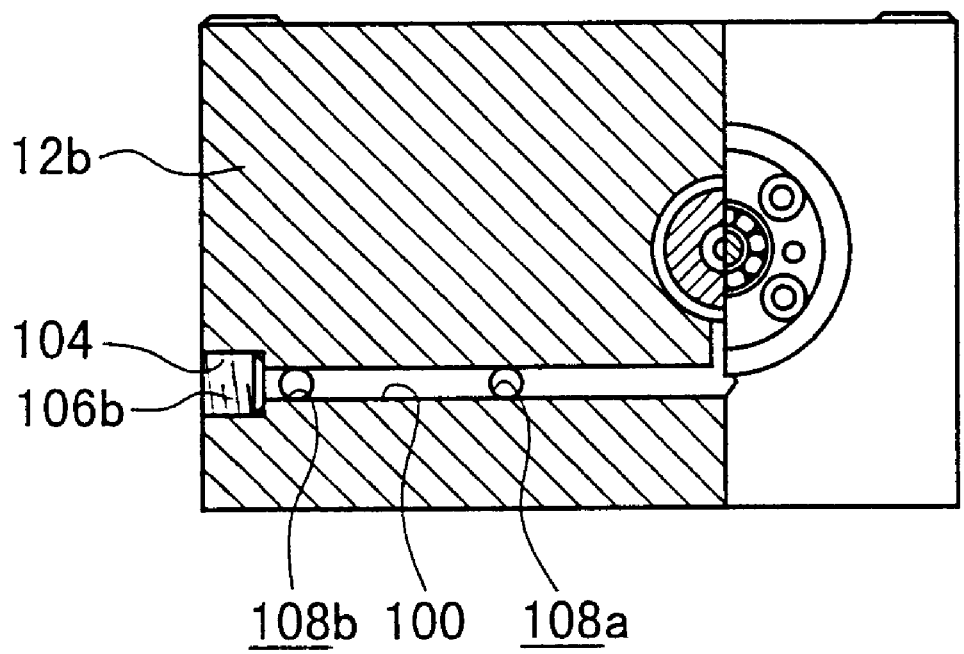
FIG. 7 is a vertical sectional view taken along a line VII—VII shown in FIG. 5.

As shown in FIGS. 5 to 7, a first passage 98 communicating with the first chamber 58a and a second passage 100 communicating with the second chamber 58b are formed in the pair of end blocks 12a, 12b. The internal movable member 22 divides the hole in the tube member 20 to thereby form the first chamber 58a and the second chamber 58b. A first port 102 communicating with the first passage 98 and a second port 104 communicating with the second passage 100 are closed by a pair of plug members 106a, 106b. A first communicating passage 108a and a second communicating passage 108b for communicating the first passage 98 formed in the first end block 12a and the second passage 100 formed in the second end block 12b are formed substantially in parallel in the base member 14.

Being divided by the internal movable member 22, the first chamber 58a and the second chamber 58b of the tube member 20 are kept communicated via the first communicating passage 108a and the second communicating passage 108b. Further, the first and second ports 102, 104 are closed by the plug members 106a, 106b. The air remaining in the tube member 20 is thus prevented from being externally discharged.

The rodless cylinder 10 according to the embodiment of the present invention is basically constructed as described above. Its operation, function, and effect will be now explained.

An unillustrated power source is energized to rotate the drive shaft 18*a* in a given direction under the driving action of the rotary driving source 18. The rotary driving force of the rotary driving source 18 is transmitted to the slide screw shaft 46 connected to the drive shaft 18*a* and the rotary motion thereof is converted into the rectilinear motion by the slide screw nut 48 for the slide screw shaft 46 to be screwed therein.

The internal movable member 22 connected to the slide screw nut 48 is displaced along the hole of the tube member 20 integrally with the slide screw nut 48. Then, the yokes 80 magnetically coupled to the driving magnets 70 are attracted by the displacement of the driving magnets 70 of the internal movable member 22. The internal movable member 22 and the external movable member 24 including the slider 40 are integrally displaced along the tube member 20.

When the internal movable member 22 is displaced along the hole of the tube member 20, the remaining air in the second chamber 58*b* disposed in the displacement direction is supplied to the first chamber 58*a* via the first communicating passage 108*a* and the second communicating passage 108*b* communicating with the second passage 100 (or first passage 98). The residual pressure, which may be caused by the air remaining in the second chamber 58*b* in the displacement direction, is buffered to thereby make it possible to smoothly displace the internal movable member 22.

If the polarity of the current applied to the rotary driving source 18 is inverted, the internal movable member 22 and the external movable member 24 including the slider 40 can be displaced in the direction opposite to the above. If an excessive load is applied to the internal movable member 22 via the slide screw shaft 46, the magnetic coupling between the internal movable member 22 and the external movable member 24 is automatically canceled. Accordingly, it is not necessary to provide any special equipment such as a brake mechanism.

In the embodiment of the present invention, the rotary driving source 18 such as a motor is used as the driving source to transmit the rotary driving force of the rotary driving source 18 to the internal movable member 22 via the rotary driving force-transmitting mechanism 28 including the slide screw shaft 46 and the slide screw nut 48. Accordingly, it is possible to stop the slider 40 at the displacement terminal end positions as well as at an arbitrary position including an intermediate position.

The rotary driving source 18 is controlled (for example, PWM control) by a control signal (for example, pulse signal) outputted from an unillustrated controller to highly accurately control the position where the slider 40 stops. Further, the slider 40 can be smoothly displaced if the start or the stop thereof is controlled to a low displacement speed.

In the embodiment of the present invention, the first chamber 58*a* and the second chamber 58*b* are mutually communicated via the first and second communicating passages 108*a*, 108*b*. The first and second passages 98, 100 are closed with the plug members 106*a*, 106*b* respectively. Therefore, the discharge pressure is mitigated to thereby make it possible to displace the internal movable member 22 smoothly. In addition, the air is prevented from being externally discharged. Accordingly, the linear actuator of the present invention can be preferably used in an installation environment where the cleanness is required.

In the embodiment of the present invention, the tube member 20 is supported by the support rib 52. The tube member 20 is not bent even if the lengthy tube member 20 increases the displacement amount of the slider 40. Therefore, the displacement amount of the slider 40 can easily be increased. Then, the yokes 80, the driven magnets 82 or the like of the tube member 20 and the external movable member 24 are kept out of contact to prevent the dust from generating. Accordingly, the linear actuator can suitably used in an installation environment where the cleanness is required.

In the embodiment of the present invention, the support rib 52 extends substantially horizontally along the inner wall of the side section 32*a* of the base member 14 so as not to increase the height size of the entire apparatus. Accordingly, the slider 40 can be stably displaced with a low center of gravity.

If the first and second communicating passages 108*a*, 108*b* formed in the base member 14 are blocked, the plug members 106*a*, 106*b* are removed to supply the air from the first port 102 or the second port 104. Then, the air can function as an auxiliary power source for the rotary driving source 18.

The air used as the auxiliary power source makes it possible to use a rotary driving source 18 of a compact size which does not consume high electric power. Further, if the rodless cylinder 10 vertically stands for use, the air can function as a torque-supporting mechanism for moving the slider 40 upwardly.

Figure 8:
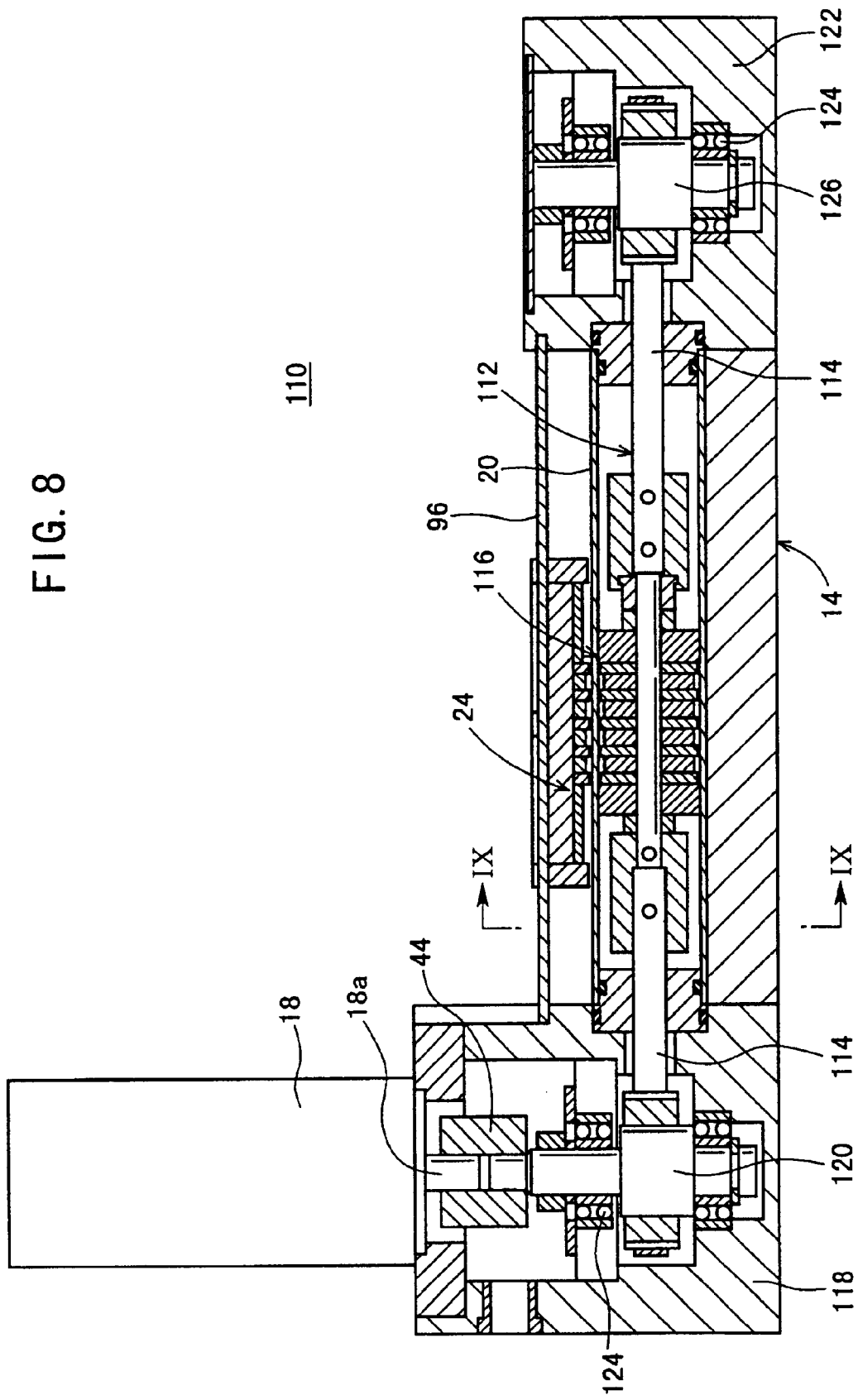
FIG. 8 is a longitudinal sectional view taken along an axial direction, illustrating a rodless cylinder according to another embodiment of the present invention.
Figure 9:
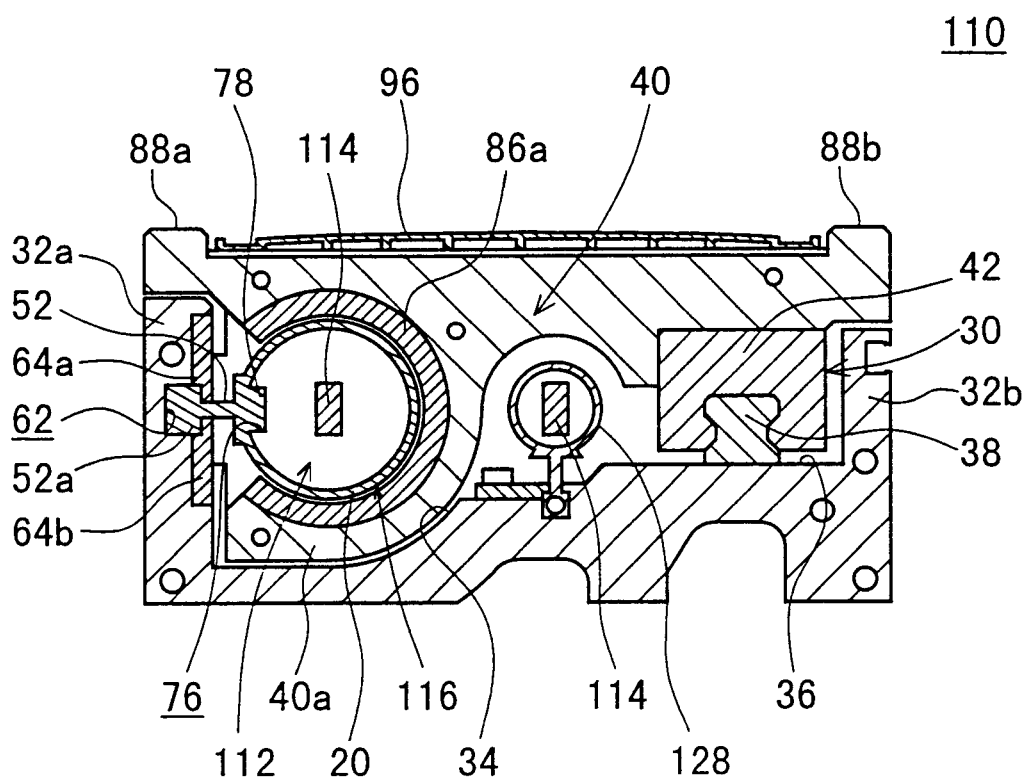
FIG. 9 is a vertical sectional view taken along a line IX—IX shown in FIG. 8.

A rodless cylinder 110 according to another embodiment of the present invention is shown in FIGS. 8 and 9. The same components as those of the above embodiment are designated by the same reference numerals, detailed explanation of which will be omitted.

Another embodiment is different from the above embodiment in that an internal movable member 116 is displaced by using a timing belt 114 as the rotary driving force-transmitting mechanism 112.

Specifically, a first pulley 120 is connected to a drive shaft 18*a* of a rotary driving source 18 in a first end block 118. A second pulley 126 is rotatably supported by a bearing 124 in a second end block 122. The timing belt 114 runs over the first pulley 120 and the second pulley 126.

The timing belt 114 is tightly sealed by a first tube member 20 having a large diameter and a second tube member 128 having a small diameter. Therefore, the dust or the like is prevented from externally generating and the rodless cylinder can be suitably used in an installation environment where the cleanness is required (see FIG. 9).

In comparison with the slide screw system, the displacement amount of the slider 40 can be increased to provide a long stroke in the driving system using the timing belt. In addition, the internal movable member 116 is constructed as a unit of a small size because it is not necessary for the screw to penetrate through the connecting internal movable member 116.

The other function and effect are the same as those of the above embodiment, detailed explanation of which is omitted.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A linear actuator comprising:
   a base mechanism;
   a rotary driving source which is connected to said base mechanism;

a tube member which extends in an axial direction of said base mechanism and which is supported by said base mechanism;

an internal movable member which is provided in said tube member and which is displaceable along said tube member, said internal movable member being disposed in sliding contact with an inner wall surface of said tube member, wherein a chamber of said tube member is divided by the internal movable member into a first chamber and a second chamber;

an external movable member which is provided outside of said tube member and which is displaceable in an axial direction of said tube member integrally with said internal movable member under a magnetic coupling action of said internal movable member; and a rotary driving force-transmitting mechanism which transmits rotary driving force of said rotary driving source to said internal movable member, wherein said base mechanism has a communicating passage therein for communicating said first chamber and said second chamber disposed in said tube member.

2. The linear actuator according to claim 1, wherein said rotary driving force-transmitting mechanism includes a feed screw shaft which is connected to a drive shaft of said rotary driving source, and a feed screw nut which converts rotary motion into rectilinear motion under the screwing action of said feed screw shaft.

3. The linear actuator according to claim 1, wherein said rotary driving force-transmitting mechanism includes a belt which runs over between a first pulley and a second pulley and which displaces said internal movable member under the driving action of said rotary driving source.

4. The linear actuator according to claim 1, further comprising a support rib which supports said tube member, said support rib provided continuously in a longitudinal direction of said base mechanism.

5. The linear actuator according to claim 1, wherein said communicating passage is a closed passage externally isolated.

6. The linear actuator according to claim 1, further comprising a guide mechanism which supports said external movable member, said external movable member kept out of contact with an outer circumferential surface of said tube member.

7. The linear actuator according to claim 1, wherein said base mechanism comprises a base member and a pair of end blocks connected to both ends thereof in said axial direction of said base member.

8. The linear actuator according to claim 4, wherein said support rib is provided to extend substantially horizontally along an inner wall of a side section of said base mechanism.

9. The linear actuator according to claim 3, wherein said belt is tightly sealed by a first tube member having a large diameter and a second tube member having a small diameter, said first and second tube members extending substantially in parallel to said base mechanism.

10. The linear actuator according to claim 1, further comprising first and second ports communicating with said first and second communicating passages respectively, and removable plug members disposed in said first and second ports, wherein said plug members are removable to permit a fluid to be supplied from at least one of said first port and said second port, said fluid functioning as an auxiliary power source for said rotary driving force-transmitting mechanism.

11. The linear actuator according to claim 1, further comprising a rotation-preventive plate expanding from said inner wall surface of said tube member, and a long groove provided in said internal movable member, wherein said internal movable member is prevented from rotating by said rotation-preventive plate which engages with said long groove.

* * * * *